United States Patent [19]
Banerjea et al.

[11] Patent Number: 6,003,932
[45] Date of Patent: Dec. 21, 1999

[54] JOINTS FOR PLATE TRAILERS

[75] Inventors: Tara N. Banerjea; John A. Hinz, both of Monticello, Ind.

[73] Assignee: HPA Monon Corporation, Monon, Ind.

[21] Appl. No.: 09/203,437

[22] Filed: Dec. 1, 1998

[51] Int. Cl.$^6$ ............................................. B62D 33/04
[52] U.S. Cl. ........................................ 296/181; 52/464
[58] Field of Search .................................. 296/181, 191, 296/183; 52/464, 461, 459, 395, 467, 468, 470, 471

[56] References Cited

U.S. PATENT DOCUMENTS

| | | |
|---|---|---|
| 1,693,750 | 12/1928 | Groehn . |
| 2,283,574 | 5/1942 | Pillsbury ................................... 189/84 |
| 3,075,802 | 1/1963 | Lowe ........................................ 296/29 |
| 3,103,379 | 9/1963 | Stone et al. .............................. 296/28 |
| 3,126,224 | 3/1964 | Carter, Jr. et al. ....................... 296/28 |
| 3,334,007 | 8/1967 | Flagan ............................... 296/191 X |
| 3,393,920 | 7/1968 | Ehrlich .................................... 280/106 |
| 4,222,606 | 9/1980 | Brown et al. ........................... 296/183 |
| 4,455,803 | 6/1984 | Kornberger .............................. 52/395 |
| 4,455,807 | 6/1984 | Ehrlich ..................................... 52/770 |
| 4,685,721 | 8/1987 | Banerjea .................................. 296/181 |
| 4,810,027 | 3/1989 | Ehrlich .................................... 296/181 |
| 4,904,017 | 2/1990 | Ehrlich .................................... 296/181 |
| 4,940,279 | 7/1990 | Abbott et al. ........................... 296/181 |
| 4,958,472 | 9/1990 | Ehrlich ..................................... 52/584 |
| 5,058,756 | 10/1991 | Green ....................................... 220/1.5 |
| 5,066,066 | 11/1991 | Yurgevich et al. ..................... 296/181 |
| 5,112,099 | 5/1992 | Yurgevich et al. ..................... 296/181 |
| 5,195,800 | 3/1993 | Stafford et al. ........................ 296/181 |
| 5,439,266 | 8/1995 | Ehrlich .................................... 296/181 |
| 5,584,252 | 12/1996 | Smith et al. ....................... 296/181 X |

FOREIGN PATENT DOCUMENTS

| | | |
|---|---|---|
| 1627443 | 2/1991 | U.S.S.R. . |
| 748475 | 5/1956 | United Kingdom . |

OTHER PUBLICATIONS

Undated—Publication Entitled "Logistics Post Option"—® Trailer Dimensions Sep. 11, 1995—Publication—Pines® Trailer Limited Partnership Entitled "Take the Bulge out of your Plate Wall Fleet", Transport Topics.

*Primary Examiner*—Joseph D. Pape
*Attorney, Agent, or Firm*—Abelman, Frayne & Schwab

[57] ABSTRACT

A cargo carrier is disclosed which includes walls including a plurality of adjacent plates with outer surfaces, at least a selected pair of the adjacent plates being spaced from each other by a predetermined amount. A joint is provided for joining the selected pair of adjacent plates, which includes an inner strip extending between the adjacent plates, the inner strip overlying at least a marginal portion of each plate. An outer strip extends between the adjacent plates and defines a generally vertical axis located generally centrally of the space, the outer strip overlying the inner strip and having an outer surface and an inner surface which faces the inner strip. The inner surface includes a pair of adjacent surface portions which respectively taper from the outer strip toward the inner strip in respectively opposite directions such that the maximum dimension between the inner and outer strip is substantially coincident with the vertical axis. Structure is provided for fastening the first and second strips to the plates, and means is provided for receiving logistics fittings generally aligned with the vertical axis. In an alternative embodiment the tapered surface portions are replaced with an arcuate concave surface. A false point is also disclosed to provide added stiffness to the structure and uniformity of appearance. A joining member for such cargo carrier is also disclosed.

39 Claims, 3 Drawing Sheets

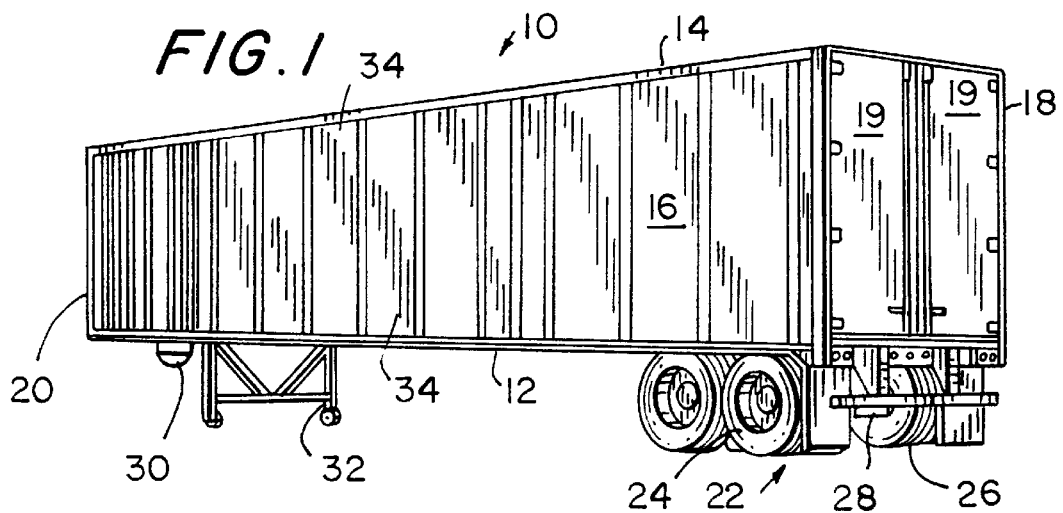
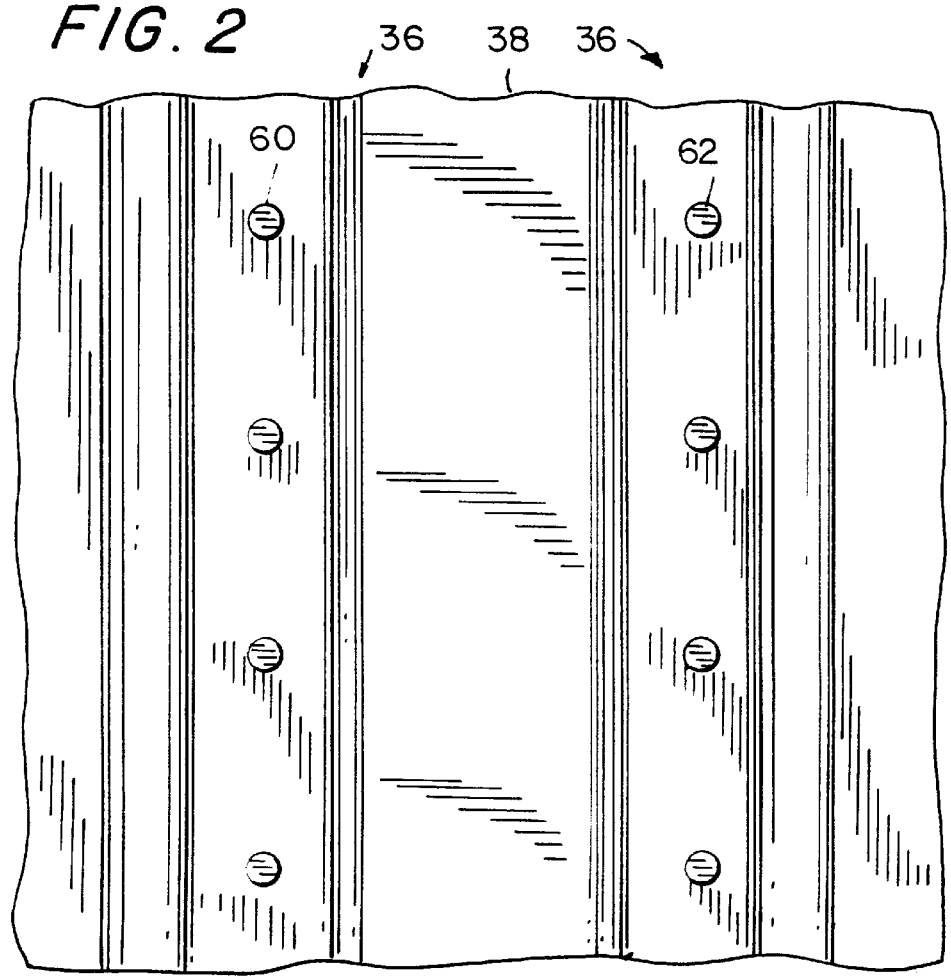

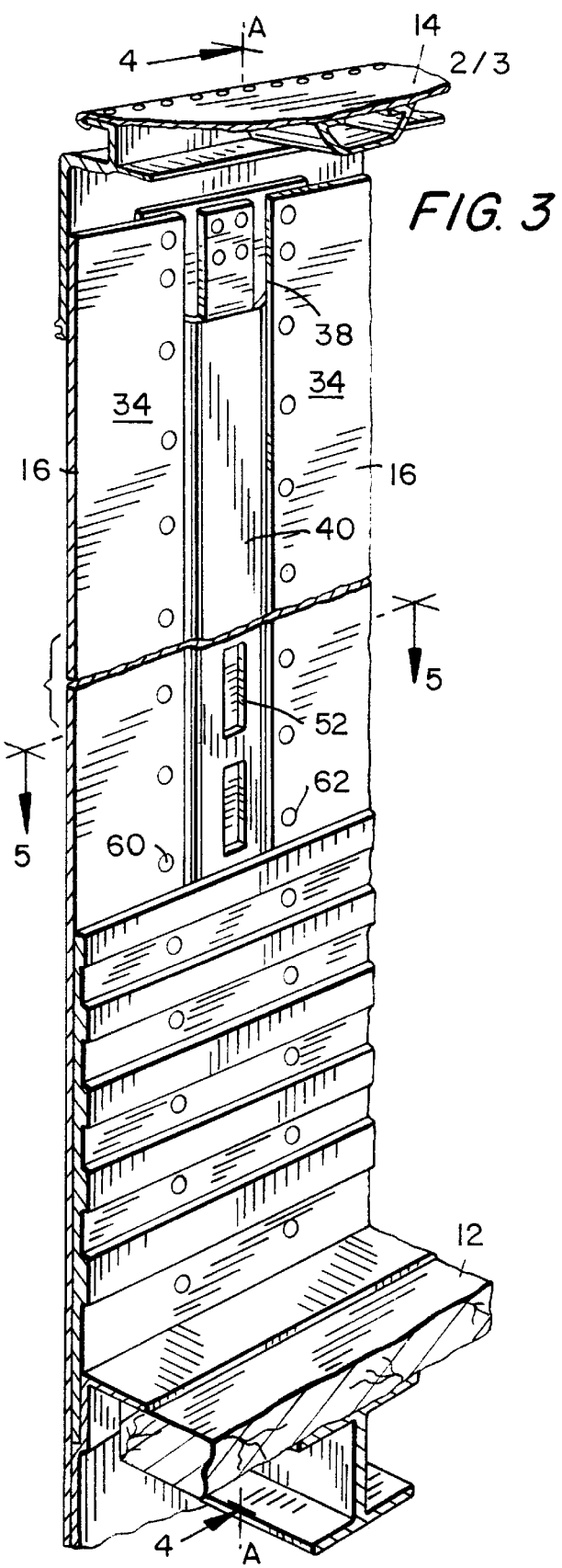
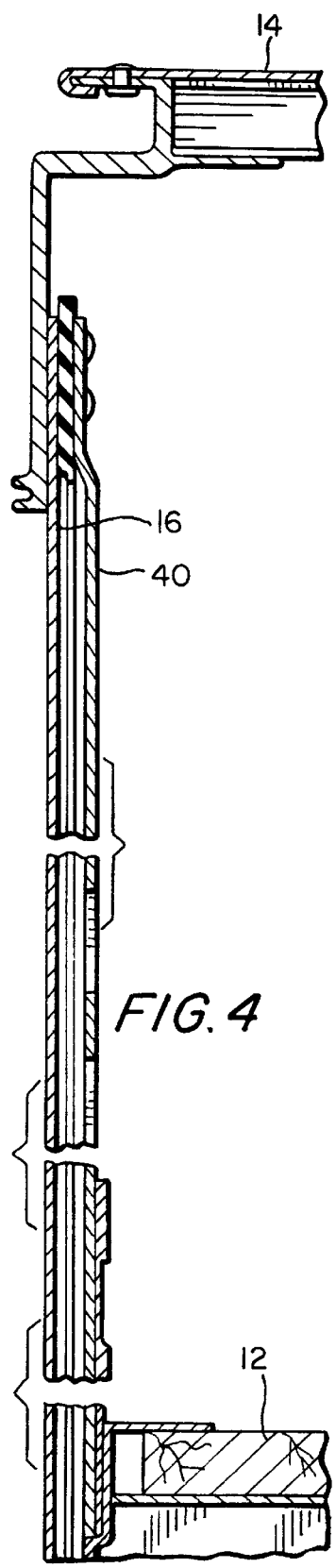

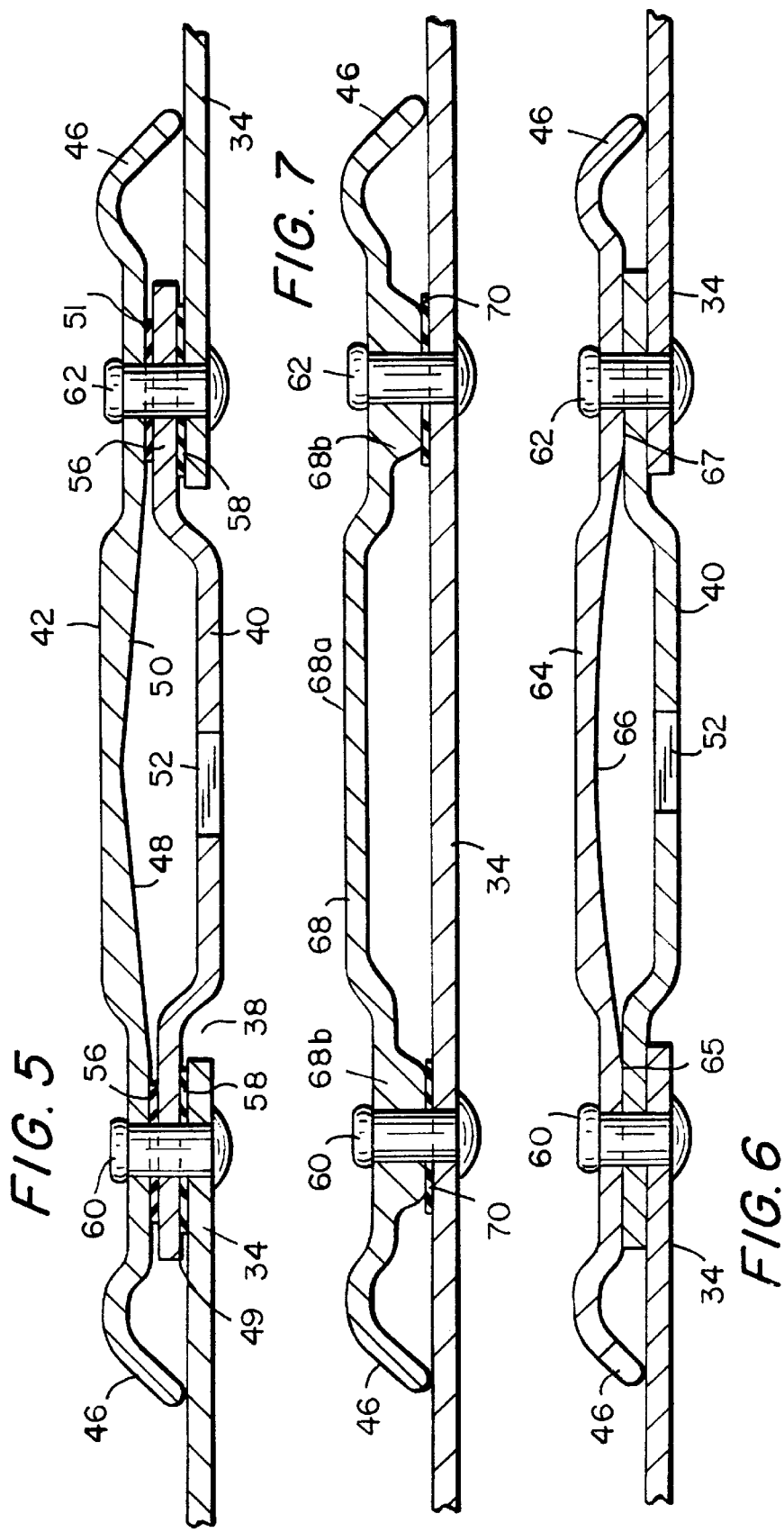

JOINTS FOR PLATE TRAILERS

BACKGROUND OF THE INVENTION

1. Field of the Invention

The present invention relates to van-type semi-trailers and similar cargo vehicles and containers of the type constructed of a plurality of upstanding rectangular panels composed of thin aluminum plate or composite materials, wherein a space is provided between at least a selective pair of adjacent plates.

2. Description of the Prior Art

The van-type semi-trailers and cargo vehicles contemplated by the present invention generally include a trailer section constructed of a plurality of rectangular panels composed of thin aluminum plate or composite materials. Such materials are generally disclosed in U.S. Pat. Nos. 4,685,721, 4,810,027, 4,904,017, 4,940,279, 5,066,066 and 5,112,099. In particular, such cargo vehicles include at least a portion of the wall structure thereof formed by such adjacent panels which are maintained in side-by-side relationship.

Cargo carriers of the type disclosed in the above noted patents generally employ particularly thin rectangular panels which are coupled by relatively flat joining members in a manner to form a semi-trailer, cargo vehicle, container, or other cargo carrier having a high cubic capacity. The thickness of the plate materials which form the walls of such cargo carriers is maintained at a minimum in order to maximize the volume of the cargo carrier for a given width. Accordingly, in the construction of such cargo carriers, particular care has been required in the handling of the panel members in order to protect the edges of the panel members to ensure that the panels are smooth and flat. For example, any burr, bend, or crease can have a tendency to allow moisture to creep between the panel member and the joining member joining the panel to an adjacent panel, thereby tending to permit possible damage to the cargo carrier contents. Also, any burr, bend or crease in the plate edge may have the tendency to displace the joining member outwardly from the edge portions of the plate. The special care handling requirements imposed during the construction of such carriers contributed directly to an increased manufacturing cost of such carriers.

Other particular problems of such plate type cargo carriers have resulted when it became desirable and necessary to include logistics tracks on the sides of such cargo carriers. Logistics tracks are generally vertically oriented steel tracks which include apertures or other means to attach logistic fittings or supports such as hooks or the like. The attachment of logistics tracks directly to the flat plates is effectively prohibited since such an attachment requires holes in the plates for fasteners, which can contribute to the invasion of weather, causing elements such as rain, snow or the like to enter. Also, such holes can also produce unwanted stress which may contribute to untimely product failure.

U.S. Pat. No. 5,112,099 to Yurgevich et al. relates to plate trailer joints wherein a joining member for joining an adjacent pair of plates on the side of a cargo carrier is formed by a rectilinear strip having an inner surface which includes a pair of flanges positioned between two rows of apertures straddling a channel of uniform depth. In one embodiment, an outer rectilinear strip and an inner rectilinear strip are provided, each strip having an outer surface, an inner surface, parallel edges joining the outer and inner surfaces, and two rows of apertures extending between the outer and inner surfaces. One row of apertures is provided adjacent each of the edges of the outer and inner strips for receiving means for fastening the strips to the plates. The outer strip inner surface includes a pair of flanges positioned between the selected pair of adjacent plates and projecting toward the inner strip outer surface forming a channel of uniform depth situated between the pair of flanges, and the inner strip includes means aligned with the channel for receiving logistics fittings. In one embodiment the pair of flanges are positioned between the selected pair of adjacent plates and extend from the outer plate entirely to the inner plate and contact the outer surface of the inner plate. In another embodiment the flanges extend from the outer plate toward the inner strip outer surface, but do not physically contact the inner strip outer surface.

While the joint disclosed in the Yurgevich et al '099 patent is stated to provide the stiffness and capability of attachment of logistic fittings to the inside of the trailer sides, some difficulty occurs in providing the requisite stiffness, while maintaining the space between the inner strip and the outer strip at a maximum to accommodate hooks for supporting logistics fittings. Furthermore, with such structure maintaining the inner wall-to-wall dimension at a maximum is often difficult. In particular, in order to maintain a maximum dimension for the logistics fittings, hooks or the like, the inner strip of the structure disclosed in the Yurgevich et al patent is required to protrude inwardly of the vehicle body. However, since inward protrusion of the inner strip effectively reduces usable space within the vehicle body, it is normally desirable to minimize the dimension in which the inner strip protrudes into the vehicle body. The present invention provides improved stiffness for such joints for plate trailers while maintaining the inner wall-to-wall useful dimension of the trailer at a maximum, as well as maintaining a maximum dimension within the joint for reception of logistics hooks at the precise location where the greatest dimension for such hooks is required to be located.

SUMMARY OF THE INVENTION

A cargo carrier is disclosed having walls including a plurality of adjacent plates with outer surfaces, at least a selected pair of the adjacent plates being spaced from each other by a predetermined amount, and a joint for joining the selected pair of adjacent plates, which comprises, an inner strip extending between said adjacent plates, the inner strip overlying at least a marginal portion of each plate, an outer strip extending between the adjacent plates and defining a generally vertical axis located generally centrally of the space. The outer strip overlies the inner strip and has an outer surface and an inner surface which faces the inner strip. The inner surface has a cross-sectional configuration such that the maximum dimension between the inner and outer strip is substantially coincident with the vertical axis. Preferably the inside surface of the outer strip has a cross-section which includes a pair of adjacent surface portions which respectively taper from the outer strip toward the inner strip in respectively opposite directions to provide such a maximum dimension therebetween coincident with the vertical axis. Means is provided for fastening the first and second strips to said plates, and means is provided for receiving logistics fittings generally aligned with the vertical axis.

Preferably the inner strip is generally rectilinear, and the outer strip is generally rectilinear. Also the rectilinear inner strip has a generally U-shaped cross-sectional configuration and a central portion of the outer strip has an outer surface of generally U-shaped cross-sectional configuration and opposite to the direction of the U-shaped cross-sectional configuration of the inner strip. Both of the central portions are positioned generally within the space between the first and second plates.

The inner strip is fabricated of steel plate material and the outer strip is fabricated of extruded aluminum and includes marginal portions each having a generally arcuate cross-sectional configuration. Means in the form of apertures for receiving logistics fittings are provided in the inner strip. The means for fastening the first and second strip to the plates comprises a plurality of rivets.

A joining member is disclosed for joining a pair of adjacent plates on a side of a cargo carrier, the plates defining a space therebetween, which comprises, an inner strip extending between the plates, the strip overlying at least a marginal portion of each plate. An outer strip extends between the plates and defines a vertical axis generally centrally located with respect to the space between the plates. The outer strip overlies the inner strip at least over a marginal portion of each plate adjacent the space and has an outer surface which faces outwardly and an inner surface which faces the inner strip. The inner surface has a cross-sectional configuration such that the maximum dimension between the inner surface of the outer strip and the inner strip is located generally at the vertical axis. Preferably the inner surface of the outer strip has a cross-section which includes a pair of surfaces which taper from the vertical axis toward the inner strip. Means is provided for fastening the inner and outer strips to the plates, and means is the form of apertures is associated with the inner strip for receiving logistics fittings and being generally aligned with the vertical axis.

The present invention provides an improved relatively streamlined outer surface for the cargo carrier, while maintaining the maximum inner space Additionally, it should be noted that the relatively streamlined outer surface better facilitates the inclusion of logos or advertisement indicia, either by way of vinyl (or other type) decals or by direct paint marking or the like, with an improved appearance of continuity and resistance to removal from the surface.

A false joint is disclosed having an outer appearance similar to the first mentioned logistics joint, the false joint having an outer strip fastened to at least one of the plates and having marginal portions each having a generally arcuate cross-sectional configuration.

BRIEF DESCRIPTION OF THE DRAWINGS

Preferred embodiments of the invention are described hereinbelow with reference to the drawings, wherein:

FIG. 1 is a perspective view of a plate trailer incorporating adjoining members in accordance with the present invention;

FIG. 2 is a side view of a portion of one of the side walls of the plate trailer shown in FIG. 1, illustrating a joint constructed according to the present invention;

FIG. 3 is a perspective view of a vertical section cut away from one of the side walls of the plate trailer shown in FIG. 1, illustrating the joint between adjacent plates constructed according to the present invention;

FIG. 4 is a cross-sectional view taken along lines 4—4 of FIG. 3;

FIG. 5 is a cross-sectional view taken along lines 5—5 of FIG. 3, and illustrating the plate trailer joint constructed according to the present invention;

FIG. 6 is a cross-sectional view similar to FIG. 5, illustrating an alternative embodiment of the plate trailer joint constructed accordingly to the present invention; and FIG. 7 is a cross-sectional view of another portion of the side wall of the plate trailer shown in FIG. 1, illustrating a false plate trailer joint provided at locations on the side walls of the plate trailer to render an appearance of the uniformity along the side walls.

DETAIL DESCRIPTION OF THE PREFERRED EMBODIMENT

In the present application the expression "plate trailer" refers to a cargo carrying trailer which forms part of a vehicle and which includes side walls, a roof, and end walls constructed of plate members generally of the type utilized to construct such trailer vehicles. The term "inner" refers to the direction inward of the trailer body and the term "outer" refers to the direction outside the trailer body.

Referring now to FIG. 1 in conjunction with FIGS. 2 and 3, the plate trailer body 10 constricted according to the invention, which includes a floor 12, a roof 14, and a pair of side walls 16 and 18 as shown. The trailer body 10 also includes a forward bulkhead 20, rear doors 19, a suspension 22, including wheels 24 and 26, and one or more axles 28 for supporting a rearward portion of the trailer 10. The trailer 10 also includes a king pin 30 for attachment to the fifth wheel of a tractor in the conventional manner, and a landing gear 32 for supporting the trailer 10 when not attached to a tractor. Each side wall 16 and 18 comprises a plurality of generally flat rectangular plates 34 which may be constructed either of a lightweight metallic material, preferably tempered aluminum alloy, or which may be a composite structure employing a thin aluminum skin bonded to each side of a polymeric core of polypropylene, polyethylene, of the like. The plates 34 are joined by joining members 36 which are in the form of vertically oriented rectilinear strips shown in greater detail in FIGS. 3–5.

Referring now to FIGS. 2 and 3, the plates 34 are situated with respect to each other to define a space 38 of predetermined dimension therebetween, which space is joined by a pair of strips as will be described. Referring to FIG. 3 in conjunction with FIGS. 4 and 5, the plates 34 are joined by an adjoining member which includes first inner rectilinear strip 40 and second outer rectilinear strip 42 overlying the first inner rectilinear strip 40 as best shown in FIG. 5. Inner rectilinear strip 40 is dimensioned and configured as shown such that the marginal portions thereof overlie the rectilinear plates 34 by a predetermined dimension as shown. As shown in FIG. 5, the inner strip 40 has a generally U-shaped cross-sectional configuration such that the central portion of strip 40 extends inwardly into the space 38 between the plates 34 to increase the maximum dimension between the inner strip 40 and the outer strip 42, as well as to provide stiffness for inner strip 40 and the adjacent vertical rectilinear plates 34 joined as shown. Outer rectilinear strip 42 also includes an outer surface 44 which has a generally inverse U-shaped cross-section and which further includes end portions 46 which are generally arcuately configured to provide strength to the outer strip 44. In addition to providing strength to outer strip 42, the arcuate marginal portions 46 strengthen the joint and provides a decorative appearance for the outside wall of the plate trailer shown in FIG. 1.

Referring now to FIG. 5 in conjunction with FIG. 3, the inner surface of second outer rectilinear strip 42 is configured to include two oppositely tapered surfaces 48 and 50 which taper from the generally central axis A—A (as shown in FIG. 3) of the strip 42 toward rivets 60 and 62, respectively. Preferably, the tapered surfaces 48, 50 meet the respective untapered surfaces 49, 51 at locations outside of the space 38 formed between plates 34, as shown. Because of their respective shapes and orientations, the taper of each surface 48 and 50 is intended to provide strength and rigidity to the outer rectilinear strip 42, while at the same time increasing or maximizing the width of the space between the first inner strip 40 and the second outer strip 42 for reasons which will be described. In FIG. 5 the first inner strip 40 is preferably constructed of rolled steel and is provided with a plurality of apertures 52 for attachment of hooks or the like for the purpose of supporting logistics fittings. In particular, the steel construction of first inner strip 40 and the apertures 52 provided in the steel strip 40 provide an excellent support base for supporting logistics fittings and any cargo or attachments which may be of significant weight, while the second outer strip 42 is constructed of lightweight aluminum and provides an overall decorative uniform and repetitive appearance from joint to joint as viewed along the sides of the plate trailer. Thus, the particular configuration shown affords the necessary strength to the joint of the plate trailer while providing the strength for attachment of logistics fittings to steel inner strip 40.

The plate trailer joint illustrated optionally may include sealing strips 56, 58 positioned between plates 34 and strips 40 and 42 as shown. Such sealing strips provide weatherproofing at the joints, with the plates and strips being attached to each other to form a unitary joint by appropriate rivets 60, 62. It is worthy of note that the rivets 60, 62 are preferably shaped to have rivet heads as shown in order to minimize the discontinuities of the outer surface of the plate trailer, while assuring weather sealing of the joint by the sealing members 56, 58. The sealing members 56, 58 can be made of any suitable weather striping material such as PVC, foam, tape, or the like.

Referring once again to FIG. 5 it can be seen that the particular configuration of the outer strip 42 and the inner tapered surfaces 48 and 50 provide an arch-like configuration which is substantially resistant to the forces usually transmitted to the side walls of such plate trailers when traveling over rough surfaces. Such forces generally include tension, compression, bending and torsional forces. Furthermore, in addition to the added strength provided by the inner surface configuration of the outer strip 42, the space between the first inner strip 40 and the outer strip 42 is maximized at the location of vertical axis A—A (shown in FIG. 3) so as to maximize the critical dimension between the strips 40, 42 in order to receive hooks or other logistics fittings and other logistics hanging devices such as shelf supports and the like. The overall strength of the joint is thus improved, with resulting weatherproof qualities, while increasing the strength above that which the structure would have if the side walls were otherwise constructed of that continuous thin aluminum plates.

Referring now to FIG. 6 there is illustrated an alternative embodiment of the plate trailer joint shown in FIG. 5. In particular, in FIG. 6 the plate trailer joint is intended to connect spaced trailer plates 34 in a manner similar to the embodiment of the joint shown in FIG. 5 with several exceptions and distinguishing features. The first distinguishing feature of the embodiment shown in FIG. 6 is that the optional weather strip sealing tape has been eliminated. Thus the final length of rivets 60, 62 as shown in FIG. 6 may be of slightly less length then the rivets shown in FIG. 5. However, for practical purposes the initial length of the rivets 60, 62 may be the same as in FIG. 5, with some slight variation in the dimensions of the formed rivet heads. For example, the heads of rivets 60, 62 as shown in FIG. 6 are slightly thicker than the rivets shown in FIGS. 5 and 7.

Further, the second outer strip 64 of the embodiment in FIG. 6 is provided with an inner surface 66 which is arcuately shaped in a manner to maximize the widthwise space between second outer strip 64 and first inner strip 40 at the location of the vertical axis A—A shown in FIG. 3. However, in the embodiment of FIG. 6 the inner surface 66 is a single continuous arcuately shaped surface as shown, thereby replacing the two oppositely tapered planar surfaces in the embodiment of FIG. 5. As shown, inner arcuate surface 66 is concave with respect to inner strip 40, such that the surface bows away from strip 40. This configuration also provides improved strength characteristics for the outer strip 64 in tension, compression, bending and torsion modes, while maximizing the widthwise space between the second outer aluminum strip 64 and the first inner steel strip 40 so as to facilitate the insertion of hooks or other logistics fittings and other logistics hanging equipment within apertures 52. As in the previous embodiment, preferably the arcuate surface 66 meets the straight surfaces 65, 67 on each side at a location outside of the space 38 formed between plates 34, as shown. The distinctions between the embodiments of FIG. 5 and FIG. 6 are not believed to be substantial in terms of the strength and functioning characteristics of the joint.

Referring now to FIG. 7 there is illustrated a cross-sectional view of a false plate trailer joint which is intended to be provided on the plate trailer of FIG. 1 at locations where an actual joint either of the type shown in FIG. 5 or the type shown in FIG. 6 is not provided. One purpose of the false joint shown in FIG. 7 is to provide an overall appearance of uniformity to the side walls of the trailer such that the actual spacing between the functioning joints is provided as needed, while facilitating an outer appearance of uniformity. The false joint shown in FIG. 7 includes an outer strip 68 having an outer surface configuration identical to the outer surface configuration of strips 42 and 64 shown respectively in the embodiments of FIGS. 5 and 6. However, as seen in the cross-sectional view of FIG. 7, the outer strip 68 is positioned directly over a continuous plate 34 and is provided with straight section 68a and thickened anchor portions 68b at the rivets 60, 62 in order to extend outwardly from the plate 34 the same distance as strip 42 extends from plates 34 in the embodiment of FIG. 5 and the distance which plate 64 extends from plates 34 in the embodiment of FIG. 6. In addition, the increased thickness of the anchor portions 68a of outer strip 68 of the false joint shown in FIG. 7 provides an advantage in that the initial length (or size) of rivets 60, 62 is the same as that of rivets 60, 62 of the joints of FIGS. 5 and 6. This feature will facilitate rapid and uniform production of the side walls of the plate trailer during construction thereof, by eliminating the need to use multiple sizes of rivets. It is noted once again that although the actual final length of rivets 60, 62 may vary slightly between the embodiments of the FIGS. 5 and 7, due to the added thickness provided by sealing members 56, 58 in the embodiment of FIG. 5, such added thickness will result in rivets 60, 62 having a slightly longer length in the embodiments of FIGS. 5 and 6, with corresponding slight differences in the formed rivet heads in the various embodiments.

Furthermore, it should be noted that the provision of the false joint shown in FIG. 7 provides an additional advantage in that it adds stiffness to the side plates 34 of the plate trailer and accordingly renders the plate trailer side walls stiffer then they would otherwise be without the false joints. Such stiffness is provided by the positioning and attachment of strip 68 in contacting relation with plate 34 to provide multi-directional support. Also, the provision of thicker anchor portions 68b of strip 68 of the false joint as shown in FIG. 7 contributes still additional stiffness to the plates 34 than would otherwise be provided by a configuration of the type shown in FIGS. 5 and 6. In particular, the average mass distance between strip 68 and plate 34 is greater than the corresponding average mass distance due to the added thickness of portions 68 as compared to a configuration which does not include such thickened anchor portions 68b.

Additionally, it can be seen that optionally the areas of rivets 60, 62 can be provided in the false joint of FIG. 7 with PVC, foam, weather strip tape, etc., in the same manner as is provided in the actual joint constructions of FIGS. 5 and 6. Although optional, the inclusion of such weather strip tape is preferred in order to provide additional sealing of the riveted connection against elements of weather such as rain, snow and ice.

In practice, the side walls of the plate trailer shown in FIG. 1 are constructed of a series of vertically extending rectilinear plates 34 connected by the plate trailer joints of the type shown in FIG. 5 or FIG. 6, whereas for purposes of uniformity a false trailer joint of the type shown in FIG. 7 may be selectively positioned between the actual functional trailer joints of either FIG. 5 or FIG. 6. Thus, it will be readily obvious to persons skilled in the art that the relatively thin plates 34 which are generally flexible would be normally subjected to substantial stresses, particularly when the trailer vehicle negotiates a difficult terrain. By utilizing the plate trailer joints of either FIG. 5 or FIG. 6 in combination with the false trailer joint of FIG. 7. More than the requisite stiffness and strength is provided to the side walls of the plate trailer to eliminate excessive bending or distortion due to stresses.

Although the invention has been described in detail with reference to the illustrated preferred embodiments, variations and modifications may be provided within the scope and spirit of the invention as described and as defined by the following claims.

We claim:

1. A cargo carrier having walls including a plurality of adjacent plates with outer surfaces, at least a selected pair of the adjacent plates being spaced from each other by a predetermined space, and a joint for joining the selected pair of adjacent plates, which comprises:
   a) an inner strip extending between said adjacent plates, said inner strip overlying at least a marginal portion of each plate;
   b) an outer strip extending between said adjacent plates and defining a generally vertical axis located generally centrally of the space, said outer strip overlying said inner strip and having an outer surface and an inner surface, said inner surface of said outer strip facing said inner strip, said inner surface of said outer strip including a pair of adjacent surface portions which respectively taper from said outer strip from a location generally coincident with said generally vertical axis and extend toward said inner strip in respectively opposite directions such that the maximum dimension between said inner surface of said outer strip and said inner strip is substantially coincident with said generally vertical axis;
   c) means for fastening said first and second strips to said plates; and
   d) means for receiving logistics fittings generally aligned with said generally vertical axis.

2. The cargo carrier according to claim 1, wherein said inner strip is generally rectilinear, and said outer strip is generally rectilinear.

3. The cargo carrier according to claim 2, wherein a central portion of said rectilinear inner strip has a generally U-shaped cross-sectional configuration.

4. The cargo carrier according to claim 3, wherein a central portion of said outer strip has an outer surface of generally U-shaped cross-sectional configuration and opposite the direction of said U-shaped cross-sectional configuration of said inner strip, both said central portions being positioned generally within the space between the first and second plates.

5. The cargo carrier according to claim 4, wherein said inner strip is fabricated of steel plate material and said outer strip is fabricated of aluminum.

6. The cargo carrier according to claim 5, wherein said outer strip is extruded aluminum and includes marginal portions each having a generally arcuate cross-sectional configuration.

7. The cargo carrier according to claim 6, wherein said means for receiving logistics fittings comprises at least one aperture in said inner strip.

8. The cargo carrier according to claim 7, wherein said means for receiving logistics fittings comprises a plurality of apertures in said inner strip.

9. The cargo carrier according to claim 8, wherein said means for fastening said first and second strip to said plates comprises a plurality of fasteners.

10. The cargo carrier according to claim 9, wherein said fasteners are rivets.

11. A cargo carrier having side walls including a plurality of adjacent plates with outer surfaces, at least a selected pair of the adjacent plates being spaced from each other by a predetermined space, and a joint for joining said selected pair of adjacent plates, which comprises an outer generally rectilinear strip and an inner generally rectilinear strip, each said strip having an outer surface, an inner surface, and at least two rows of apertures extending between said outer and inner surfaces, said apertures being located for receiving means for fastening said strips to the plates, said inner strip outer surface and said outer strip inner surface facing each other and defining a channel within said space between the plates, at least one of said facing surfaces including a pair of adjacent surface portions which respectively taper in opposite directions from a generally central portion of said channel and extend toward said other strip such that the maximum dimension of said channel between said strips is located at said generally central portion.

12. The cargo carrier according to claim 11, wherein said inner and outer surfaces of each of said generally rectilinear strips are joined by parallel edges.

13. The cargo carrier according to claim 11, wherein said rows of apertures are located generally adjacent each of said edges of said outer and inner strips.

14. The cargo carrier according to claim 11, wherein a generally central portion of said inner generally rectilinear strip has a generally U-shaped cross-sectional configuration.

15. The cargo carrier according to claim 14, wherein a generally central portion of said outer generally rectilinear strip has an outer surface of generally U-shaped cross-section, said central portions of said inner and said outer strips being positioned generally within the space between the plates.

16. The cargo carrier according to claim 15, wherein said inner generally rectilinear strip comprises means for receiving logistics fittings.

17. The cargo carrier according to claim 16, wherein said means for receiving logistics fittings comprises at least one aperture in said inner strip.

18. The cargo carrier according to claim 17, wherein said means for receiving logistics fittings comprises a plurality of apertures in said inner strip.

19. The cargo carrier according to claim 15, wherein said plurality of apertures are located generally centrally of said generally rectilinear inner strip and in general alignment with the location of maximum dimension of said channel between the plates.

20. A cargo carrier having walls including a plurality of adjacent plates with outer surfaces, at least a selected pair of the adjacent plates being spaced from each other by a predetermined space, and a joint for joining the selected pair of adjacent plates, which comprises:

a) an inner strip extending between said adjacent plates, said inner strip overlying at least a marginal portion of each plate;

b) an outer strip extending between said adjacent plates and defining a generally vertical axis located generally centrally of the space, said outer strip overlying said inner strip and having an outer surface and an inner surface, said outer strip inner surface facing said inner strip, said inner strip having an inner surface and an outer surface, said inner strip outer surface and said outer strip inner surface defining a channel therebetween, at least one of said inner strip outer surface and said outer strip inner surface being spaced from said other strip and configured in cross-section to include a pair of adjacent surface portions which respectively taper toward the other strip from a location generally in the region of said generally vertical axis so as to define a channel therebetween which is of maximum dimension at a location generally aligned with said generally vertical axis;

c) means for fastening said first and second strips to said plates; and d) means for receiving logistics fittings generally aligned with said generally vertical axis.

21. The cargo carrier according to claim 20, wherein said pair of tapered surface portions respectively extend from a location generally coincident with said generally vertical axis to respective locations outside the space defined between the adjacent plates.

22. A cargo carrier having walls including a plurality of adjacent plates with outer surfaces, at least a selected pair of the adjacent plates being spaced from each other by a predetermined space, and a joint for joining the selected pair of adjacent plates, which comprises:

a) an inner strip extending between said adjacent plates, said inner strip overlying at least a marginal portion of each plate;

b) an outer strip extending between said adjacent plates and defining a generally vertical axis located generally centrally of the space, said outer strip overlying said inner strip and having an outer surface and an inner surface which faces said inner strip, said outer strip inner surface and said inner strip defining a channel therebetween, said inner surface of said outer strip being formed of at least one continuous arcuate surface which is concave with respect to said inner strip and spaced therefrom, said arcuate surface configured and dimensioned so as to define a space which is maximum at a location generally aligned with said generally vertical axis;

c) means for fastening said first and second strips to said plates; and d) means for receiving logistics fittings generally aligned with said vertical axis.

23. A joining member for joining a pair of adjacent plates on a side of a cargo carrier, the plates defining a space therebetween, which comprises:

a) an inner strip extending between said plates, said strip overlying at least a marginal portion of each plate;

b) an outer strip extending between said plates and defining a vertical axis generally centrally located with respect to the space between the plates, said outer strip overlying said inner strip at least over a marginal portion of each plate adjacent the space, said outer strip having an outer surface which faces outwardly and an inner surface which faces said inner strip, said inner surface of said outer strip including a pair of adjacent surface portions which respectively taper from said outer strip from a location generally in the region of said vertical axis and extend toward said inner strip to respective locations outside the space defined between the plates, such that the maximum dimension between said inner surface of said outer strip and said inner strip is located generally in the region of said vertical axis;

c) means for fastening said inner and outer strips to said plates; and d) means associated with said inner strip for receiving logistics fittings generally aligned with said vertical axis.

24. The joining member according to claim 22, wherein said pair of tapered surface portions respectively extend from a location generally coincident with said generally vertical axis to respective locations outside the space defined between the adjacent plates.

25. A joining member for joining a pair of adjacent plates on a side of a cargo carrier, at least a selected pair of the adjacent plates being spaced from each other so as to define a space therebetween, which comprises:

a) an inner strip extending between said plates, said inner strip overlying at least a marginal portion of each plate;

b) an outer strip extending between said plates and defining a vertical axis generally centrally located with respect to the space between the plates, said outer strip overlying said inner strip at least over a marginal portion of each plate adjacent the space, said outer strip having an outer surface and at least one continuous arcuate inner surface which faces said inner strip, said arcuate inner surface being concave with respect to said inner strip so as to define a maximum dimension between said inner surface of said outer strip and said inner strip located generally in the region of said vertical axis;

c) means for fastening said inner and outer strips to said plates; and d) means associated with said inner strip for receiving logistics fittings generally aligned with said vertical axis.

26. The cargo carrier according to claim 1, further comprising at least one false joint having an outer appearance similar to said first mentioned joint, said false joint having an outer strip fastened to at least one of said plates and having marginal portions each having a generally arcuate cross-sectional configuration.

27. The cargo carrier according to claim 25, wherein said continuous arcuate inner surface which faces said inner strip extends from a location generally coincident with said vertical axis to respective locations outside the space defined between the adjacent plates.

28. The cargo carrier according to claim 25, further comprising at least one false joint having an outer appearance similar to said first mentioned joint, said false joint having an outer strip fastened to at least one of said plates and having marginal portions each having a generally arcuate cross-sectional configuration.

29. The cargo carrier according to claim 28, wherein said outer strip of said false joint includes fastening portions for fastening said outer strip to at least one of the plates, wherein said fastening portions are of greater thickness than corresponding fastening portions of said outer strip of said first mentioned joining member.

30. The cargo carrier according to claim 26, wherein said outer strip of said false joint includes fastening portions for fastening said outer strip to at least one of the plates, wherein said fastening portions are of greater thickness than corresponding fastening portions of said outer strip of said first mentioned joining member.

31. A cargo carrier having side walls including a plurality of adjacent plates with outer surfaces, at least a selected pair of the adjacent plates being spaced from each other by a predetermined space, and a joint for joining said selected pair of adjacent plates, which comprises an outer generally rectilinear strip and an inner generally rectilinear strip, each said strip having an outer surface, an inner surface, and at least two rows of apertures extending between said outer and inner surfaces, said apertures being located for receiving means for fastening said strips to the plates, said inner strip outer surface and said outer strip inner surface facing each other and defining a channel within said space between the plates, at least one of said facing surfaces of one of said strips including at least one generally continuous arcuate surface portion which faces said other strip, said generally continuous arcuate surface portion configured and dimensioned so as to define said channel with said other strip whereby the maximum dimension of said channel is located substantially at a generally central portion with respect to said space.

32. The cargo carrier according to claim 31, wherein said inner and outer surfaces of each of said generally rectilinear strips are joined by parallel edges.

33. The cargo carrier according to claim 32, wherein said rows of apertures are located generally adjacent each of said edges of said outer and inner strips.

34. The cargo carrier according to claim 33, wherein a generally central portion of said inner generally rectilinear strip has a generally U-shaped cross-sectional configuration.

35. The cargo carrier according to claim 34, wherein a generally central portion of said outer generally rectilinear strip has an outer surface of generally U-shaped cross-section, said central portions of said inner and said outer strips being positioned generally within the space between the plates.

36. The cargo carrier according to claim 35, wherein said inner generally rectilinear strip comprises means for receiving logistics fittings.

37. The cargo carrier according to claim 36, wherein said means for receiving logistics fittings comprises at least one aperture in said inner strip.

38. The cargo carrier according to claim 37, wherein said means for receiving logistics fittings comprises a plurality of apertures in said inner strip.

39. The cargo carrier according to claim 38, wherein said plurality of apertures are located generally centrally of said generally rectilinear inner strip and in general alignment with said location of maximum dimension of said channel between the plates.

* * * * *